(12) United States Patent
Kang et al.

(10) Patent No.: US 12,496,883 B2
(45) Date of Patent: Dec. 16, 2025

(54) VEHICLE DOOR OPENING/CLOSING SYSTEM

(71) Applicants: Hyundai Motor Company, Seoul (KR); Kia Corporation, Seoul (KR)

(72) Inventors: Chang Hak Kang, Hwaseong-si (KR); Jae Seung Lee, Hwaseong-si (KR); Gook Hyun Jeon, Seoul (KR); Chan Woong Jeon, Incheon (KR); Sang Kyoung Han, Gunpo-si (KR); Hae Hoon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 561 days.

(21) Appl. No.: 18/158,260

(22) Filed: Jan. 23, 2023

(65) Prior Publication Data

US 2024/0066960 A1    Feb. 29, 2024

(30) Foreign Application Priority Data

Aug. 23, 2022   (KR) .................. 10-2022-0105690

(51) Int. Cl.
*E05F 15/63* (2015.01)
*B60J 5/04* (2006.01)

(52) U.S. Cl.
CPC ............ *B60J 5/0463* (2013.01); *E05F 15/63* (2015.01); *B60J 5/0479* (2013.01); *E05Y 2201/434* (2013.01); *E05Y 2201/624* (2013.01); *E05Y 2600/452* (2013.01); *E05Y 2900/531* (2013.01)

(58) Field of Classification Search
CPC ........ E05F 15/63; B60J 5/0477; B60J 5/0479; E05D 15/32; E05D 15/34
USPC .............................. 296/146.12, 146.4
See application file for complete search history.

(56) References Cited

U.S. PATENT DOCUMENTS

| | | | | |
|---|---|---|---|---|
| 6,030,024 | A | * | 2/2000 | Schmidhuber .......... E05D 15/34 296/146.12 |
| 6,305,737 | B1 | * | 10/2001 | Corder .................... E05F 15/63 296/146.12 |
| 6,382,705 | B1 | * | 5/2002 | Lang .......................... B60J 5/06 49/248 |
| 11,738,626 | B2 | * | 8/2023 | Sumiya ................. E05D 15/101 296/146.12 |
| 2022/0194478 | A1 | | 6/2022 | Song |

FOREIGN PATENT DOCUMENTS

EP            125703 A   * 11/1984
KR       20220086890 A      6/2022

* cited by examiner

*Primary Examiner* — Joseph D. Pape
(74) *Attorney, Agent, or Firm* — Slater Matsil, LLP

(57) ABSTRACT

An embodiment vehicle door opening/closing system includes an inner panel defining a door open portion of a vehicle, the inner panel including an installation groove having a protruding or recessed shape, a driving device disposed in the installation groove of the inner panel, and a link mechanism installed on a chassis through a rotating shaft, a first end of the link mechanism being connected to the driving device such that power is transferred thereto, and a second end of the link mechanism being connected to a door such that, during driving of the driving device, the link mechanism rotates with reference to the rotating shaft to open/close the door.

20 Claims, 8 Drawing Sheets

VEHICLE DOOR OPENING/CLOSING SYSTEM

CROSS-REFERENCE TO RELATED APPLICATIONS

This application claims the benefit of Korean Patent Application No. 10-2022-0105690, filed on Aug. 23, 2022, which application is hereby incorporated herein by reference.

TECHNICAL FIELD

The present disclosure relates to a vehicle door opening/closing system.

BACKGROUND

Recently, a new concept of future mobility vision has been introduced in the automobile industry to implement human-oriented dynamic future cities. One of such future mobility solutions is a purpose built vehicle (PBV) (purpose-based mobility vehicle).

The PBV is an eco-friendly mobility solution for providing customized services needed by occupants while moving to the destination on the ground, and can utilize electric car-based artificial intelligence to configure optimal paths for respective situations and to conduct platooning.

For example, the PBV is designed in a box shape with a large indoor space. The windshield glass is provided at the front of the chassis to provide the large indoor space. Indoor-side entrances are formed on side surfaces of the chassis to be larger than those of conventional vehicles, and doors are then mounted.

In order to open the vehicle entrances formed larger than conventional vehicles, doors opened/closed through rotations of four-bar linkages are applied instead of swing doors or sliding doors applied to conventional vehicles, and there is thus a need for a chassis structure for coupling such doors having four-bar linkages applied thereto to the chassis.

The above descriptions regarding background technologies have been made only to help understanding of the background of embodiments of the present disclosure, and are not to be deemed by those skilled in the art to correspond to already known prior art.

SUMMARY

The present disclosure relates to a vehicle door opening/closing system. Particular embodiments relate to a technology regarding a vehicle door opening/closing system wherein a link mechanism rotated by operations of a driving device and a vehicle door are connected, thereby opening/closing the vehicle door.

Embodiments of the present disclosure can solve problems in the art, and an embodiment of the present disclosure provides a vehicle door opening/closing system wherein a vehicle door is opened/closed through rotations of a link mechanism, and a driving device for providing torque to the link mechanism is disposed in the indoor space of the vehicle.

A vehicle door opening/closing system according to embodiments of the present disclosure may include an inner panel configured to constitute a door open portion of a vehicle, the inner panel having an installation groove formed in a protruding or recessed shape, a driving device disposed in the installation groove of the inner panel, and a link mechanism installed on a chassis through a rotating shaft, one end of the link mechanism being connected to the driving device such that power is transferred thereto, and the other end of the link mechanism being connected to a door such that, during driving of the driving device, the link mechanism rotates with reference to the rotating shaft, thereby opening/closing the door.

One end of the link mechanism may be rotatably coupled to a floor bottom of the vehicle, the installation groove may be formed on a lower end of the inner panel such that the driving device is coupled to the lower end of the inner panel, and the vehicle door opening/closing system may further include a connecting mechanism configured to connect the driving device and the link mechanism.

The vehicle door opening/closing system may further include a side chamber extending in a forward/backward direction of the vehicle so as to be coupled to a side surface of the floor, the side chamber being indented toward an indoor space of the vehicle so as to form a containing space such that the link mechanism disposed on the floor bottom is contained therein.

The side chamber may include a side chamber inner portion having a first indented portion formed to be indented toward the indoor space of the vehicle, a side chamber outer portion protruding outwards from the side chamber inner portion and including an extension portion extending upwards, and a side chamber center portion configured to connect the first indented portion of the side chamber inner portion and the extension portion of the side chamber outer portion below the link mechanism, thereby forming a closed section.

The installation groove of the inner panel may be formed to protrude to an outside of the vehicle such that the driving device is positioned above the side chamber.

The extension portion of the side chamber outer portion may have an upper portion outwardly overlapping the lower portion of the inner panel such that the inner panel and the extension portion form an opening flange.

The side chamber inner portion may further include a first lower flange extending downwards, and the side chamber outer portion may further include a second lower flange extending downwards so as to be coupled to the first lower flange through surface contact.

The side chamber inner portion may further include an upper flange extending upwards from the first indented portion so as to be coupled to the floor of the vehicle.

The inner panel may include a first part and a second part divided in the upward/downward direction, the first part may be connected to a chassis frame, and the second part may be connected to a lower portion of the first part so as to connect the first part and the side chamber.

The second part may include a second indented portion indented toward the indoor space of the vehicle so as to be connected to an end portion of the side chamber and to cover the end portion.

The vehicle door opening/closing system may further include an outer filler portion coupled to the outside of the inner panel so as to form the outside of a filter of the chassis connecting the side chamber and a roof.

The outer filler portion may be coupled to the inner panel so as to form a closed section.

The link mechanism may be shaped such that one end thereof extends toward the indoor space of the vehicle and bends, and the other end thereof extends toward the outdoor space of the vehicle, and the containing space may be formed in the side chamber inner portion so as to be indented toward the indoor space of the vehicle more than the first indented portion.

A vehicle door opening/closing system according to embodiments of the present disclosure has advantages such as the system includes an inner panel having an installation groove formed to protrude outwards and a link mechanism for connecting the door and the chassis, a driving device for rotating the link mechanism is coupled to the indoor side in the installation groove of the inner panel and thus can be disposed on the vehicle indoor side, and watertightness of the driving device and protection against pollution are guaranteed, thereby improving durability of the driving device.

In addition, the link mechanism is connected to the vehicle floor, and a containing space is provided such that, when the door is closed, the link mechanism is contained in the side chamber. As a result, the link mechanism can be protected from external foreign materials when the door is closed and when the vehicle is traveling or even when the vehicle is stationary. This is advantageous in that durability of the link mechanism can be improved.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
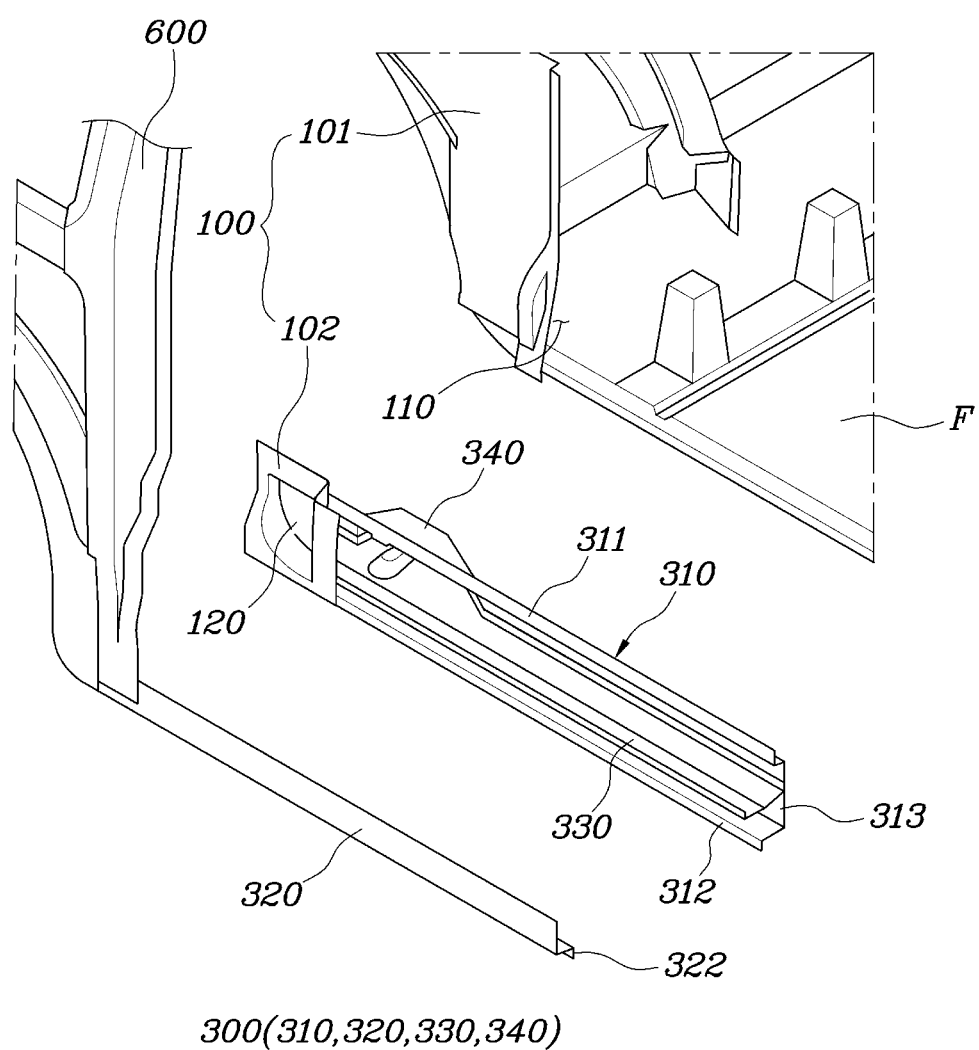
FIG. 1 is an exploded perspective view of a vehicle door opening/closing system according to an embodiment of the present disclosure.

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first," "second," or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless it is definitely different in the context.

As used herein, the expression "include" or "have" is intended to specify the existence of mentioned features, numbers, steps, operations, elements, components, or combinations thereof, and should be construed as not precluding the possible existence or addition of one or more other features, numbers, steps, operations, elements, components, or combinations thereof.

Figure 2:
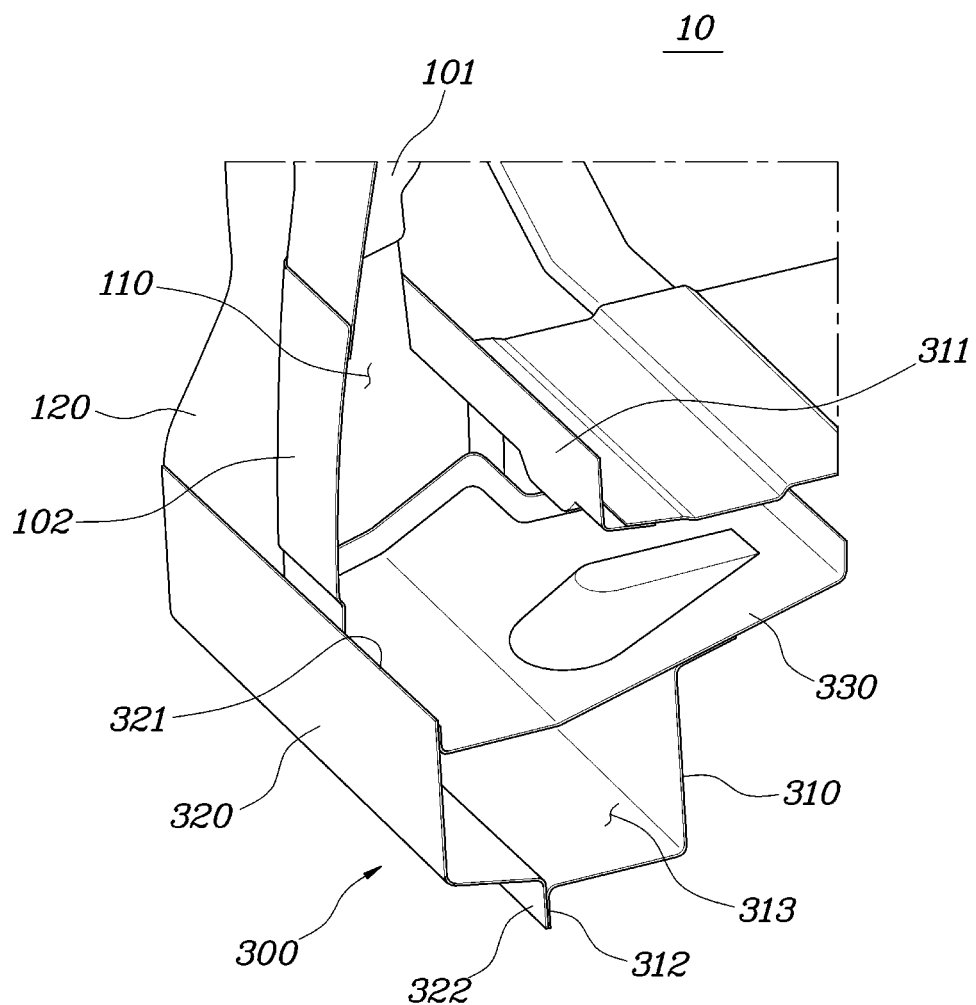
FIG. 2 is a sectional perspective view of a vehicle door opening/closing system according to an embodiment of the present disclosure.
Figure 3:
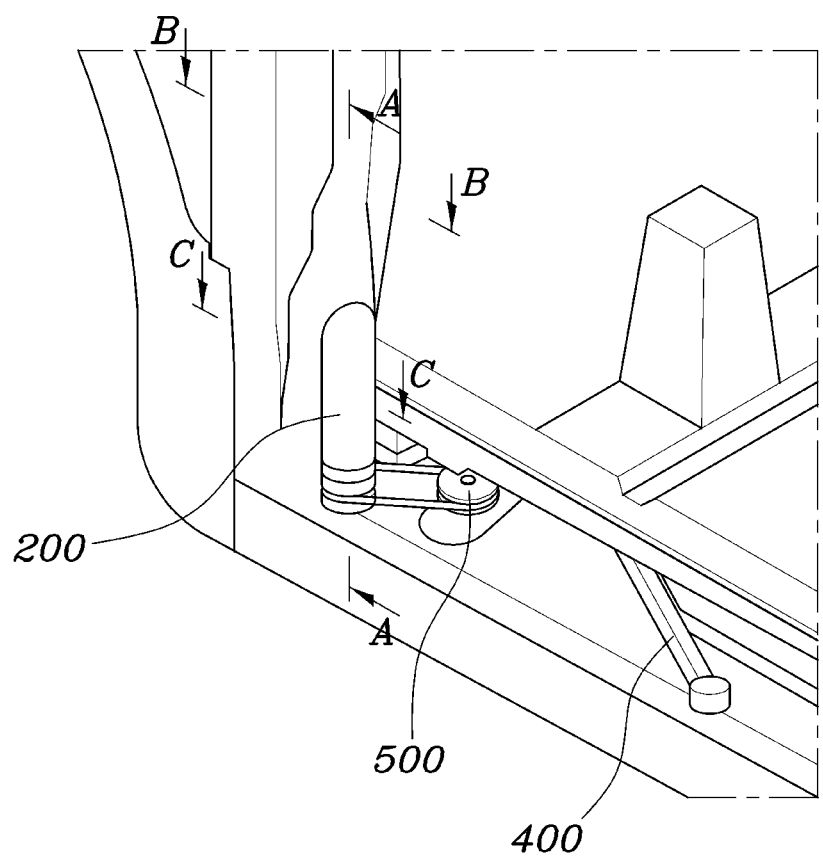
FIG. 3 is an assembled perspective view of a vehicle door opening/closing system according to an embodiment of the present disclosure.
Figure 4:
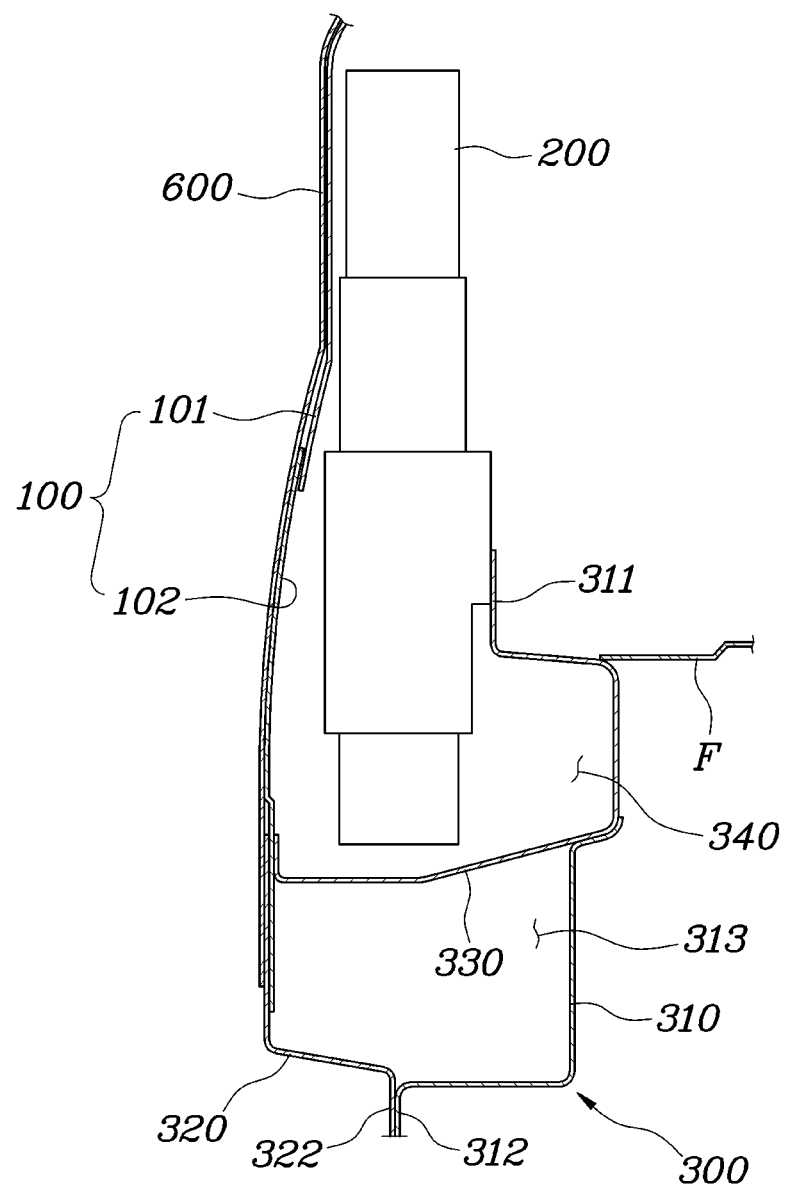
FIG. 4 is a sectional view taken along line A-A in FIG. 3.
Figure 5:
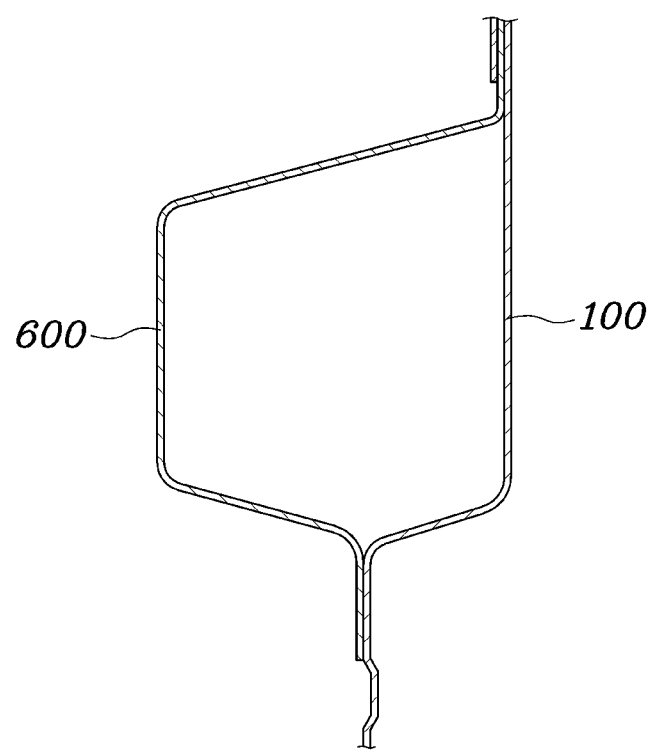
FIG. 5 is a sectional view taken along line B-B in FIG. 3.
Figure 6:
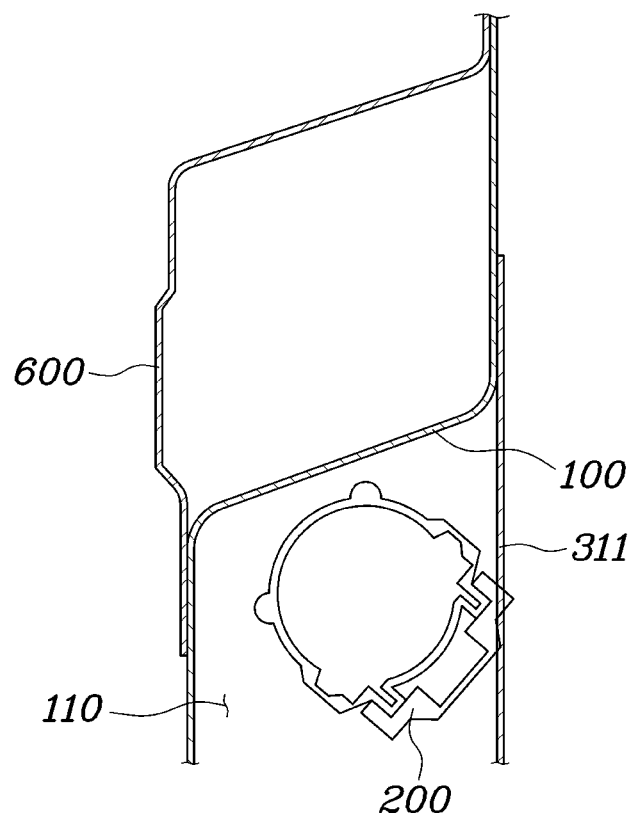
FIG. 6 is a sectional view taken along line C-C in FIG. 3.
Figure 7:
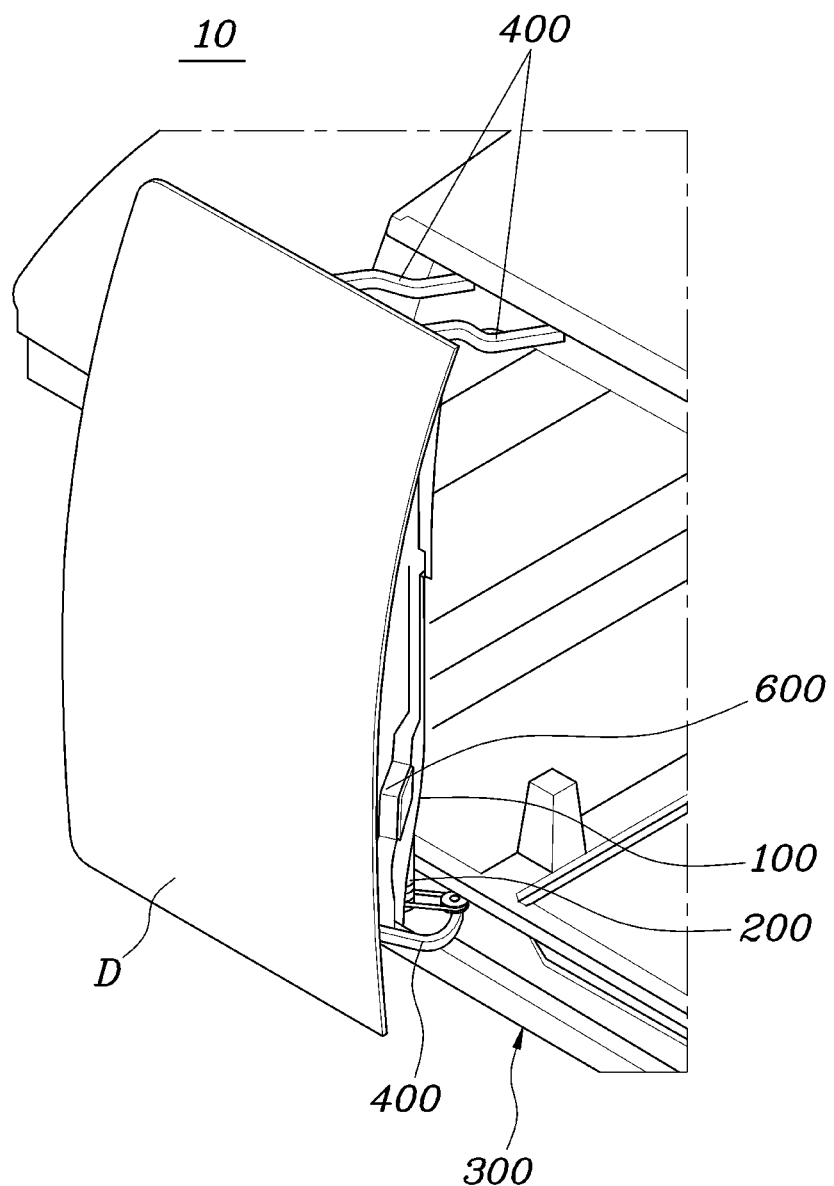
FIG. 7 is a perspective view of a vehicle door opening/closing system according to an embodiment of the present disclosure, which has a door coupled thereto.
Figure 8:
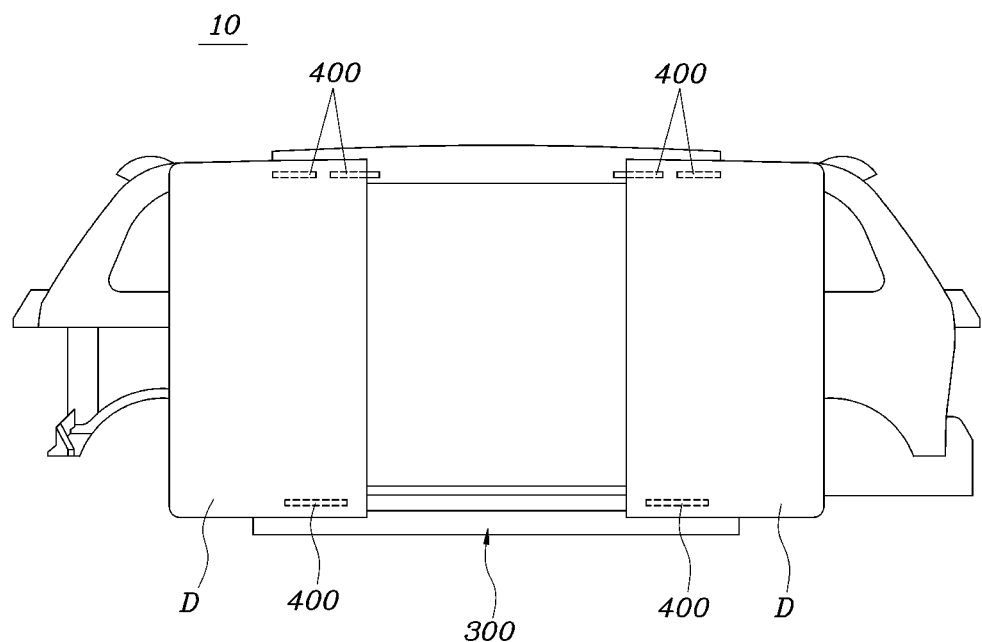
FIG. 8 is a perspective view of a vehicle door opening/closing system according to an embodiment of the present disclosure, which has a double-sided door coupled thereto.

FIG. 1 is an exploded perspective view of a vehicle door opening/closing system according to an embodiment of the present disclosure. FIG. 2 is a sectional perspective view of a vehicle door opening/closing system according to an embodiment of the present disclosure. FIG. 3 is an assembled perspective view of a vehicle door opening/closing system according to an embodiment of the present disclosure. FIG. 4 is a sectional view taken along line A-A in FIG. 3. FIG. 5 is a sectional view taken along line B-B in FIG. 3. FIG. 6 is a sectional view taken along line C-C in FIG. 3. FIG. 7 is a perspective view of a vehicle door opening/closing system according to an embodiment of the present disclosure, which has a door coupled thereto. FIG. 8 is a perspective view of a vehicle door opening/closing system according to an embodiment of the present disclosure, which has a double-sided door coupled thereto.

A vehicle door opening/closing system according to exemplary embodiments of the present disclosure will now be described with reference to FIG. 1 to FIG. 8.

A chassis 10 to which embodiments of the present disclosure are applied, manufactured as a purpose built vehicle (PBV) (purpose-based mobility vehicle), may have an open portion provided on a side surface of the vehicle such that a door is mounted therein, and a door for opening/closing the open portion may be coupled to the chassis 10.

The door may be connected to the roof and floor F of the vehicle, and may be coupled to the chassis 10 according to embodiments of the present disclosure through a link mechanism 400 including a four-bar linkage. As illustrated in FIG. 8, link mechanisms 400 may be connected to upper and lower ends of doors, respectively. A link mechanism 400 connected to the upper end may be connected to the roof, and another link mechanism 400 connected to the lower end may be connected to a side chamber 300 of the chassis 10. The link mechanisms 400 may be rotated by motors coupled to the chassis 10, thereby opening/closing the doors.

The vehicle door opening/closing system according to embodiments of the present disclosure relates to the structure of a chassis 10 for coupling such link structures and motors to the chassis 10.

The vehicle door opening/closing system according to embodiments of the present disclosure may include an inner panel 100 which constitutes a vehicle door open portion, and which has an installation groove 110 formed in a protruding or recessed shape, a driving device 200 disposed in the installation groove 110 of the inner panel 100, and a link mechanism 400 installed on the chassis 10 through a rotating shaft, one end of the link mechanism 400 being connected to the driving device 200 so as to receive power therefrom, and the other end of the link mechanism 400 being connected to the door such that, during driving of the driving device 200, the link mechanism 400 rotates with reference to the rotating shaft, thereby opening/closing the door.

In general, a vehicle door opening/closing system may have a panel (for example, roof or floor F) coupled to a frame constituting the vehicle skeleton, thereby constituting a chassis 10.

The inner panel 100 of embodiments of the present disclosure may be coupled to the vehicle frame and positioned on a side surface of the chassis 10, and the outside of the inner panel 100 may form a door open portion.

In addition, the inner panel 100 may have an installation groove 110 formed on the upper or lower portion thereof so as to protrude or recess. A driving device 200 may be coupled to the installation groove 110. The installation groove 110 may be formed such that the driving device 200 is disposed on the indoor side of the vehicle.

The vehicle door may be connected to the chassis 10 by the link mechanism 400 and may be opened/closed by rotations of the link mechanism 400. The vehicle door may be connected to the driving device 200 and rotated by power transferred from the driving device 200.

The driving device 200 for rotating the link mechanism 400, which has the above-mentioned structure, may be coupled to the inner panel 100 to be disposed in the indoor side of the vehicle. This is advantageous in that watertightness and robustness against pollution can be secured, and durability of the driving device 200 can thus be improved.

The driving device 200 may be configured in various shapes to provide power such that the link mechanism 400 rotates, and a motor device operated by electric power is preferably applied.

The link mechanism 400 may have an end rotatably coupled to the lower portion of the vehicle floor F. The installation groove 110 may be formed on the lower end of the inner panel 100 such that the driving device 200 is coupled to the lower end of the inner panel 100. The system may further include a connection mechanism 500 for connecting the driving device 200 and the link mechanism 400.

One end of the link mechanism 400 connected to a door may be rotatably connected to the vehicle floor F, and the other end thereof may be rotatably connected to the door. The installation groove 110 may be formed on the lower end of the inner panel 100 such that the driving device 200 can be coupled thereto. The driving device 200 and the link mechanism 400 may be connected to each other by the connection mechanism 500.

The connection mechanism 500 may be formed in various forms to transfer power from the driving device 200 to the link mechanism 400, thereby rotating the link mechanism 400, and is preferably connected through a pulley and a band as illustrated in FIG. 3.

Accordingly, when the door is closed, the link mechanism 400 may be rotated and disposed on the lower end of the vehicle floor F, thereby improving the aesthetic appearance. In addition, the distance between the driving device 200 and the link mechanism 400 may be minimized, thereby minimizing the length of the connection mechanism 500. As a result, power loss occurring in the connection mechanism 500 may be minimized, and costs for manufacturing the connection mechanism 500 may be reduced.

The system may further include a side chamber 300 which extends in the forward/backward direction of the vehicle, and which is coupled to a side surface of the floor F and is recessed toward the vehicle indoor space, thereby forming a containing space 340 in which the link mechanism 400 disposed on the lower portion of the floor F is contained.

The side chamber 300 may be formed in a hollow shape and coupled to a side surface of the vehicle floor F such that, when the side surface of the vehicle undergoes a collision, the same absorbs the impact and improves the robustness of the vehicle side surface, thereby protecting passengers.

The link mechanism 400 coupled to the vehicle floor F may be positioned on the lower portion of the floor F when the door is closed. The side chamber 300 may have a containing space 340 formed on the upper side thereof such that the link mechanism 400 positioned on the lower portion of the floor F is contained therein. Accordingly, when the door is closed, the link mechanism 400 may be rotated and positioned in the containing space 340.

As a result, the link mechanism 400 can be protected from external foreign materials when the door is closed and when the vehicle is traveling or even when the vehicle is stationary. This is advantageous in that durability of the link mechanism 400 can be improved.

The side chamber 300 may include a first side chamber inner portion 310 having a first indented portion 313 formed to be indented toward the vehicle indoor space, a side chamber outer portion 320 protruding outwards from the side chamber inner portion 310 and including an extension portion 321 protruding upwards, and a side chamber center portion 330 connecting the first indented portion 313 of the side chamber inner portion 310 and the extension portion 321 of the side chamber outer portion 320 below the link mechanism 400, thereby forming a closed section.

In order to form the hollow shape of the side chamber 300, the side chamber 300 may include a first side chamber inner portion 310 having a first indented portion 313 formed to be indented toward the vehicle indoor space, and the side chamber inner portion 310 may be coupled to a side surface of the floor F. A side chamber outer portion 320 may be formed to protrude outwards from the side chamber inner portion 310. A side chamber center portion 330 may be provided to connect the side chamber inner portion 310 and the side chamber outer portion 320 below the link mechanism 400 such that sections of the side chamber inner portion 310, the side chamber outer portion 320, and the side chamber center portion 330 form a closed section, thereby forming the hollow shape of the side chamber 300.

The side chamber inner portion 310, the side chamber outer portion 320, and the side chamber center portion 330 are manufactured in panel shapes and then coupled to each other through welding. This is advantageous in that material costs can be reduced compared with conventional side chambers 300.

The installation groove 110 of the inner panel 100 is formed to protrude toward the outside of the vehicle such that the driving device 200 can be positioned above the side chamber 300.

As illustrated in FIG. 1 to FIG. 4, the installation groove 110 may be formed on the inner panel 100 so as to protrude toward the outside of the vehicle, the driving device 200 may be coupled to the indoor side of the protruding installation groove 110, and the rotating shaft of the driving device 200 may be disposed to face downwards.

This is advantageous in that the driving device 200 and the link mechanism 400 disposed on the lower portion of the floor F can be disposed as close as possible, and the driving device 200, disposed in the vehicle indoor space, can be protected from external foreign materials or impacts.

The upper portion of the extension portion 321 of the side chamber outer portion 320 may overlap the lower portion of the inner panel 100 in the outward direction such that the inner panel 100 and the extension portion 321 form an opening flange.

As illustrated in FIG. 2 and FIG. 7, the extension portion 321 formed on the side chamber outer portion 320 so as to extend upwards may be coupled so as to overlap the lower end of the inner panel 100, thereby forming an opening flange together with the outside of the inner panel 100 such that, when the door is closed, they can make contact.

Such an opening flange shape may be used to couple the weather strip of the door such that, when the door is closed, foreign materials (for example, dust, or moisture) can be prevented from infiltrating into the vehicle, and external noise can be blocked.

The side chamber inner portion 310 may further include a first lower flange 312 extending downwards, and the side chamber outer portion 320 may further include a second lower flange 322 extending downwards so as to be coupled to the first lower flange 312 through surface contact.

As illustrated in FIG. 4, the side chamber inner portion 310 and the side chamber outer portion 320 may be coupled to each other. The side chamber inner portion 310 may have a first lower flange 312 formed to extend downwards from the lower end of the first indented portion. The side chamber outer portion 320 may have a second lower flange 322 formed to extend downwards and to correspond to the first lower flange 312. The first lower flange 312 and the second lower flange 322 may be coupled through welding after making surface contact.

This may increase the degree of coupling between the side chamber inner portion 310 and the side chamber outer portion 320.

The side chamber inner portion 310 may further include an upper flange 311 extending upwards from the first indented portion 313 so as to be coupled to the vehicle floor F.

The side chamber inner portion 310 may have an upper flange 311 extending upwards from the upper end of the first indented portion 313. The upper flange 311 may be coupled to a side surface of the floor F, and the upper surface of the first indented portion 313 may be coupled to the lower surface of the floor F. This may advantageously increase the degree of coupling between the side chamber 300 and the floor F.

The inner panel 100 may include a first part 101 and a second part 102 divided from each other in the upward/downward direction. The first part 101 is coupled to the frame of the chassis 10. The second part 102 is connected to the lower portion of the first part 101 so as to connect the first part 101 and the side chamber 300.

As illustrated in FIG. 1, the inner panel 100 may be divided into two parts, which may be coupled to each other. The first part 101 may be directly coupled to the frame of the chassis 10. After the first part 101 is coupled, the side chamber 300 may be coupled to the vehicle floor F, and the second part 102 may be coupled such that the first part 101 and the side chamber 300 are connected to each other.

The first part 101 and the second part 102, which are separate from each other, are then coupled to each other, and the first part 101, the side chamber 300, and the second part 102 are successively coupled to the chassis 10, thereby facilitating the coupling process. This advantageously improves the operation efficiency of operators. In addition, material costs necessary for manufacturing can be reduced because the inner panel 100 having a complicated shape is manufactured by using two separate parts.

The second part 102 may be connected to an end of the side chamber 300 and may include a second indented portion 120 indented toward the vehicle indoor space so as to cover the end.

As illustrated in FIG. 1 and FIG. 2, the second part 102 may have a second indented portion 120 indented from the outside of the vehicle toward the indoor space thereof. The second indented portion 120 may be coupled to an end of the side chamber 300 and may cover an open end of the side chamber 300 which is open, thereby preventing external foreign materials from infiltrating into the hollow side chamber 300.

The system may further include an outer filler portion 600 coupled to the outside of the inner panel 100 so as to form the outside of a filler of the chassis 10 connecting the side chamber 300 and the roof.

As illustrated in FIG. 7, the outer filler portion 600 may be coupled to the outside of the inner panel 100. The lower end of the outer filler portion 600 may be connected to the outside of the side chamber 300, and the upper end thereof may be connected to the vehicle roof.

This may enhance the robustness of the chassis 10 in the upward/downward direction and lateral direction of the vehicle.

The outer filler portion 600 may be coupled to the inner panel 100 so as to form a closed section.

As illustrated in FIG. 6 and FIG. 7, the outer filler portion 600 coupled to the outside of the inner panel 100 may form a closed section together with the inner panel 100, and thus may become a vehicle filler.

This may enhance the robustness in the upward/downward direction of the vehicle.

The link mechanism 400 may be shaped such that one end thereof extends toward the vehicle indoor space and bends, and the other end thereof extends toward the vehicle outdoor space. The containing space 340 may be formed in the side chamber inner portion 310 so as to be indented toward the vehicle indoor space more than the first indented portion 313.

As illustrated in FIG. 3 and FIG. 7, the link mechanism 400 may be shaped such that one end thereof extends toward the vehicle indoor space and bends, and the other end thereof extends toward the vehicle outdoor space (gooseneck shape). One end of the link mechanism 400 may be connected to the driving device 200 by the connection mechanism 500 and rotated accordingly.

Such a shape of the link mechanism 400 advantageously enables the link mechanism 400 to avoid interference with the vehicle filler portion or the driving device 200.

The vehicle door may be a double-sided swing door, both sides of which are symmetric to each other.

As illustrated in FIG. 8, the vehicle door opening/closing system according to embodiments of the present disclosure may be used for various purposes (for a PBV, for example) such that the chassis 10 may have a larger entrance than an entrance of a conventional chassis. A double-sided door may be coupled to the chassis 10 to open/close the entrance. The vehicle door opening/closing system according to embodiments of the present disclosure, to which a double-sided door is applied, may be formed such that both sides are symmetric with reference to the center of the open portion.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle door opening/closing system, the system comprising:
   an inner panel defining a door open portion of a vehicle, the inner panel comprising an installation groove having a protruding or recessed shape;
   a driving device disposed in the installation groove of the inner panel; and
   a link mechanism installed on a chassis through a rotating shaft, a first end of the link mechanism being connected to the driving device such that power is transferred thereto, and a second end of the link mechanism being connected to a door such that, during driving of the driving device, the link mechanism rotates with reference to the rotating shaft to open/close the door.

2. The system of claim 1, wherein the first end of the link mechanism is rotatably coupled to a floor of the vehicle, the installation groove is on a lower end of the inner panel such that the driving device is coupled to the lower end of the inner panel, and the vehicle door opening/closing system further comprises a connection mechanism connecting the driving device and the link mechanism.

3. The system of claim 2, further comprising a side chamber extending in a forward/backward direction of the vehicle so as to be coupled to a side surface of the floor, the side chamber being indented toward an indoor space of the vehicle so as to define a containing space such that the link mechanism disposed on the floor is contained therein.

4. The system of claim 3, wherein the installation groove of the inner panel protrudes to an outside of the vehicle such that the driving device is positioned above the side chamber.

5. The system of claim 3, wherein the side chamber comprises:
   a side chamber inner portion having a first indented portion indented toward the indoor space of the vehicle;
   a side chamber outer portion protruding outwards from the side chamber inner portion and comprising an extension portion extending upwards; and
   a side chamber center portion connecting the first indented portion of the side chamber inner portion and the extension portion of the side chamber outer portion below the link mechanism to define a closed section.

6. The system of claim 5, wherein the extension portion of the side chamber outer portion has an upper portion outwardly overlapping the lower end of the inner panel such that the inner panel and the extension portion define an opening flange.

7. The system of claim 5, wherein the side chamber inner portion further comprises a first lower flange extending downwards, and the side chamber outer portion further comprises a second lower flange extending downwards so as to be coupled to the first lower flange through surface contact.

8. The system of claim 5, wherein the side chamber inner portion further comprises an upper flange extending upwards from the first indented portion so as to be coupled to the floor of the vehicle.

9. The system of claim 5, wherein the link mechanism is shaped such that the first end thereof extends toward the indoor space of the vehicle and bends and a second end thereof extends toward an exterior of the vehicle.

10. The system of claim 9, wherein the containing space is in the side chamber inner portion and indented toward the indoor space of the vehicle more than the first indented portion.

11. The system of claim 3, wherein the inner panel comprises a first part and a second part divided in an upward/downward direction, the first part is connected to a chassis frame, and the second part is connected to a lower portion of the first part to connect the first part and the side chamber.

12. The system of claim 11, wherein the second part comprises a second indented portion indented toward the indoor space of the vehicle to be connected to an end portion of the side chamber and to cover the end portion.

13. The system of claim 3, further comprising an outer filler portion coupled to an outside of the inner panel to define an outside of a filler of the chassis connecting the side chamber and a roof.

14. The system of claim 13, wherein the outer filler portion is coupled to the inner panel to define a closed section.

15. A vehicle comprising:
   a vehicle body comprising a floor and a roof;
   an inner panel defining a door open portion of the vehicle, the inner panel comprising an installation groove having a protruding or recessed shape;
   a driving device disposed in the installation groove of the inner panel; and
   a link mechanism installed on a chassis through a rotating shaft, a first end of the link mechanism being connected to the driving device such that power is transferred thereto, and a second end of the link mechanism being connected to a door such that, during driving of the driving device, the link mechanism rotates with reference to the rotating shaft to open/close the door.

16. The vehicle of claim 15, wherein the first end of the link mechanism is rotatably coupled to the floor of the vehicle, the installation groove is on a lower end of the inner panel such that the driving device is coupled to the lower end of the inner panel, and the vehicle further comprises a connection mechanism connecting the driving device and the link mechanism.

17. The vehicle of claim 16, further comprising a side chamber extending in a forward/backward direction of the vehicle so as to be coupled to a side surface of the floor, the side chamber being indented toward an indoor space of the vehicle to define a containing space such that the link mechanism disposed on the floor is contained therein.

18. The vehicle of claim 17, wherein the side chamber comprises:
   a side chamber inner portion having a first indented portion indented toward the indoor space of the vehicle;
   a side chamber outer portion protruding outwards from the side chamber inner portion and comprising an extension portion extending upwards, wherein the extension portion of the side chamber outer portion has an upper portion outwardly overlapping the lower end of the inner panel such that the inner panel and the extension portion define an opening flange; and
   a side chamber center portion connecting the first indented portion of the side chamber inner portion and the extension portion of the side chamber outer portion below the link mechanism to define a closed section.

19. The vehicle of claim 18, wherein:
the link mechanism is shaped such that the first end thereof extends toward the indoor space of the vehicle and bends and a second end thereof extends toward an exterior of the vehicle; and
the containing space is in the side chamber inner portion and indented toward the indoor space of the vehicle more than the first indented portion.

20. The vehicle of claim 18, wherein:
the inner panel comprises a first part and a second part divided in an upward/downward direction;
the first part is connected to a chassis frame;
the second part is connected to a lower portion of the first part to connect the first part and the side chamber; and
the second part comprises a second indented portion indented toward the indoor space of the vehicle to be connected to an end portion of the side chamber and to cover the end portion.

* * * * *